2,700,278

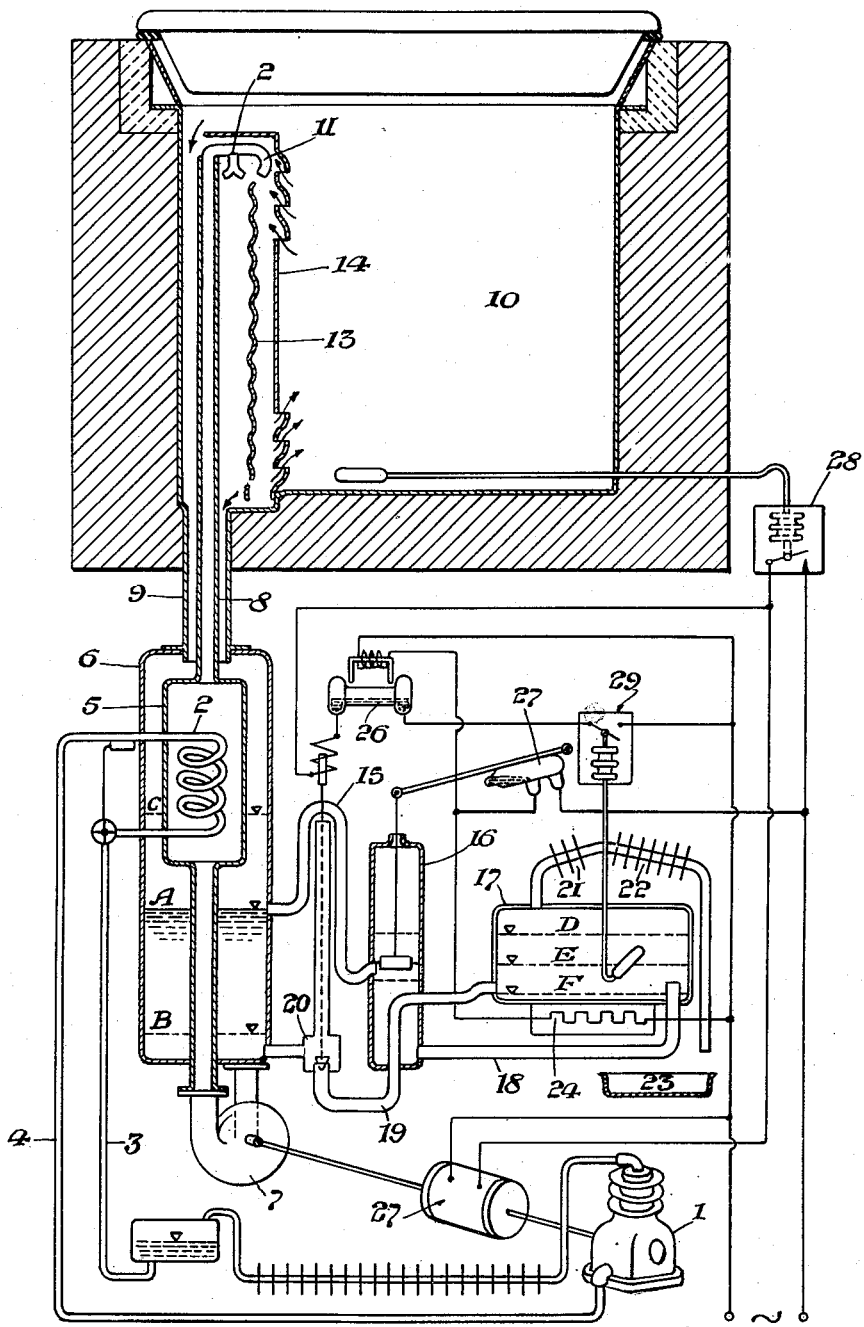

BRINE DEHYDRATION APPARATUS FOR REFRIGERATION PLANTS

Karl Arvid Johannes Wretlind, Stockholm, Sweden

Application May 14, 1952, Serial No. 287,710

Claims priority, application Sweden May 31, 1951

5 Claims. (Cl. 62—2)

In domestic refrigerators, deep freezers, and such commercial cooling plants as are operating below the freezing point of water, the problem of frost removal is usually solved by means of manually or automatically operated defrosting devices. The ordinary mode of operation of such defrosters includes the step of thawing up all those parts of the equipment on which the frost has accumulated, thus permitting the water to run off into a drip tray. In the case of deep freezers—whether domestic or commercial—this procedure often causes damage to the frozen food, particularly where the packages have to be temporarily removed in order to facilitate the defrosting.

One of the objects of my invention is to circumvent the defrosting problem by the expedient of transferring the cold from the refrigerating unit to the space to be cooled wholly or partly by means of a circulating liquid (brine) which is directly exposed to the air in the cold space and into which the humidity will be absorbed without frost formation. Part of the body of diluted brine is periodically and automatically withdrawn from the brine circuit and exposed to heat, which causes the absorbed water to distill off. The concentrated brine is thereafter returned to the circuit. Other objects of the invention will be apparent from the following description. This description is to be read in conjunction with the accompanying drawing which diagrammatically represents a typical refrigerating plant embodying my invention.

In the figure reference number 1 represents a refrigerating compressor operating on a refrigerating coil 2 in a conventional manner. The connecting lines are designated by numerals 3 and 4 respectively. Coil 2 is situated in a brine vessel 5 disposed inside a larger vessel 6. At the bottom end of vessel 6 is shown a centrifugal pump which draws brine from vessel 6 and discharges it into vessel 5. From the top end of vessel 5 extends a riser pipe 8 through a sleeve 9 into an insulated refrigerating chamber 10. At the upper end of the riser pipe there are a number of nozzles, as indicated by 11 and 12, which are for distributing cold brine on both surfaces of a vertical and corrugated plate 13, the purpose of which is to assist in conveying the cold from the brine to the air in the cold chamber 10. Plate 13 and riser pipe 8 are screened off from the main portion of chamber 10 by means of a wall plate 14 having louvres to permit the passage of the circulating cold air. Brine dripping off from plate 13 and from riser pipe 8 runs back by gravity through sleeve 9 into vessel 6.

From vessel 6 an upper syphon-shaped conduit 15 leads to an intermediate vessel 16 which in turn is connected to a boiler 17 by means of a supply conduit 18. From boiler 17 a return conduit 19 leads back to vessel 6 via a magnetic valve 20. The conduit 19 is arranged in heat exchange relation to the intermediate vessel 16.

The boiler 17 is equipped with a rectifier 21, and with a water vapor condenser 22 which discharges into a drip pan 23. The heat to the boiler is supplied from an electric heating element designated by 24. The heater current is regulated by means of a mercury switch 25 which derives its motion from a float in the intermediate vessel 16. When the heating current is on, a breaking relay 26 is also energized, thus keeping the current supply to the magnetic valve shut off, i. e., in the position where no brine is admitted through conduit 19. The current to operate the magnetic valve is taken from across the terminals of an electric motor 27 which operates the compressor 1 as well as the centrifugal pump 7. The motor current is governed by a thermostatic switch 28 in response to the temperature in the cold chamber 10. The current which operates the magnetic valve 20 is furthermore regulated by means of a thermoswitch 29 which responds to the temperature in the boiler 17. It will be realized that the magnetic valve will open only when the current through switch 25 is off, provided the motor 27 is running and boiler 17 is hot.

It will be assumed that the system is charged with a brine consisting of ethylene glycol (or diethylene glycol, or glycerine or the like) and water, the charging concentration being approximately 60% by weight. The charging level in vessel 6 is denoted by A and in vessels 16 and 17 by F.

When electric current is switched on to the plant this will operate as follows:

Motor 27 immediately starts, thereby bringing the compressor 1 and the centrifugal pump 7 into operation. Owing to the pump action, vessel 5 will quickly be filled with brine which is being cooled by coil 2. The cold is transferred to space 10 by means of the cold brine which drizzles down from nozzles 11 and 12 on to the plate 13 and over the surface of the riser pipe 8. Provided there are no unwetted metallic cold surfaces in contact with the air in the cold space no frost will form, since the humidity—which otherwise collects as frost—will be absorbed by the brine. It is obvious that the filling up of vessel 5 and standpipe 8 with brine will cause the brine level in vessel 6 to drop, say to level B. As soon as the pump stops, however, the brine level in vessel 6 will again rise to its original level A. Such change of level normally takes place as the thermostatic switch 28 brings motor 27 to operate in response to a raise in the air temperature in space 10.

After the system has been in operation for some time the brine will have absorbed moisture to the extent that level A in vessel 6 has risen to C (this refers to an off period of the motor). At this level C part of the contents of vessel 6 will rather suddenly spill over into the intermediate vessel 16 and further into the boiler 17, owing to the action of syphon 15. Level C in vessel 6 will thus drop to level A where air enters syphon 15 and interrupts the flow. The corresponding rise of the brine level in vessels 16 and 17 will be from F to D.

The rise in level in vessel 16 as described elevates the float, bringing the mercury switch 25 into its closing position. This initiates the boiling period in vessel 17 and—owing to relay 26—prevents the magnetic valve 20 to open. During the boiling period the refrigerating machinery and the brine pump will operate as usual.

The boiling action in vessel 17 causes water vapor to condense in condenser 22 and to trickle down into the drip pan 23 from where it has ample time to evaporate into the air until the next boiling period takes place. The boiling continues until the common level in vessels 16 and 17 has dropped to that predetermined point where the float valve causes switch 25 to break the heating current. This point which is designated by E is to be chosen in such a way with regard to the glycol concentration that this concentration does not exceed 75 or 80%. At this instance the magnetic valve 20 will open up conduit 19, thereby permitting the dehydrated brine from vessel 17 to drain into vessel 6 and bringing the level in vessels 16 and 17 down to F. This drainage will obviously take place only when the brine in vessel 6 is down around level B, i. e., during a running period of motor 27 and pump 7. Since conduit 19 is in heat exchange relation with vessel 16 and its contents, the returning brine will be partly cooled off before entering the cold vessel 6. As the motor 27 stops, valve 20 will close, thereby preventing any appreciable amount of brine to flow back towards vessels 16 and 17. Once the boiler vessel 17 has cooled down sufficiently to break the thermo-switch 29 the magnetic valve will remain closed, thereby preserving level F in vessels 16 and 17.

For practical and economy reasons vessel 6, pump 7, and adjoining conduits should be insulated against undue losses of cold. To prevent undue heat losses from the boiler 17 this should also be appropriately insulated.

It should be apparent that the periodic and automatic transfer of brine to and from the boiler vessel 17 is brought about from the changes in liquid level occurring in vessel 6, partly owing to the increment in volume caused by humidity absorbed, partly to the intermittent accumulation of brine in vessel 5. It should be equally obvious that said accumulation may be localized to other parts of the brine circulating system, e. g. by transforming the standpipe 8 into a combined brine receiver and cold dissipation vessel to be wetted externally by its own overflowing brine. Another modification within the scope of the invention consists in placing the evaporator coil in direct heat exchange relation to the cold space, provided the main portions of its exterior are being wetted by the circulating brine.

An alternative to the wiring diagram shown in the drawing includes substituting an additional mercury switch for the thermostatic switch 29, in which case the additional switch should be governed by the float in such a way that it interrupts the current as the float rises and approaches level D.

Another modification of the invention consists in controlling the period of destillation and the valve in line 19 by a timing device.

What I claim is:

1. A refrigerating method of the type wherein brine is used both for the removal of heat from a space to be cooled and for frost removal from that space, which comprises periodically circulating brine between a brine vessel having a free liquid level and the space to be cooled, the periods of circulation and non-circulation being identical with the operational periods of the refrigerating machinery; automatically draining a portion of the brine from said storage vessel and into an auxiliary vessel during an off period of the refrigerating machinery when the brine has absorbed sufficient moisture so that the level thereof reaches a predetermined high point; automatically applying heat to the brine drained off in response to the liquid level in said auxiliary vessel reaching a predetermined high point; automatically shutting off the heat in response to the liquid level in the auxiliary vessel having reached a predetermined low point; and draining brine regenerated by heating into said storage vessel.

2. In a refrigerating device utilizing brine for the transfer of heat from a space to be cooled as well as for frost removal from that space, in combination, a brine storage vessel having a free liquid level, means to circulate brine from said vessel through the space to be cooled, said circulation occurring periodically in accordance with the temperature in the cooled space, an auxiliary storage vessel, means for draining off brine from said storage vessel and into said auxiliary vessel during a non-operating period of the refrigeration machinery, means for automatically heating the brine drained from said storage tank when the liquid level in the auxiliary vessel reaches a predetermined high point, means for automatically deenergizing said heating means when the liquid level in the auxiliary vessel reaches a predetermined low point, and means for returning brine concentrated or regenerated by said heat to the brine storage vessel.

3. A device as claimed in claim 2, characterized in that said means for draining brine from said storage vessel into said auxiliary vessel comprises a syphon operable upon the brine in said storage vessel reaching a predetermined high level resulting from absorption of moisture by said brine during its circulation through the refrigerated space.

4. In a refrigerating device wherein the brine is utilized as a secondary refrigerant for the transfer of heat from the space to be cooled and for frost removal from that space, means for automatically dehydrating the brine which comprises, in combination, means for automatically removing from a brine storage vessel a portion of its contents of diluted brine, means for transferring the removed portion of brine to an auxiliary vessel by gravity action, heating means for dehydrating the removed portion of the brine, said means being operated in response to the liquid level in the auxiliary vessel reaching a predetermined height and means for returning the dehydrated brine to the storage vessel in heat exchange relationship with brine in transit from the brine storage vessel to the auxiliary vessel.

5. In a refrigerating device of the class described in claim 4, in which the brine level in the refrigerated brine storage vessel varies concurrently with the operational periods of the refrigerating machinery, in combination, means for draining a portion of diluted brine from said brine storage vessel during an "off" period of the machinery, heating means for dehydrating the drained off portion, and means for returning the dehydrated brine portion during an operating period of the refrigerating machinery, said removal and return of brine taking place automatically and solely by gravity action.

References Cited in the file of this patent

UNITED STATES PATENTS

| Number | Name | Date |
|---|---|---|
| 175,291 | Lount | Mar. 28, 1876 |
| 470,167 | Paige | Mar. 1, 1892 |
| 504,986 | Kurtz | Sept. 12, 1893 |
| 644,847 | Cooper | Mar. 6, 1900 |
| 970,807 | Faget | Sept. 20, 1910 |
| 1,496,676 | Jauvert | June 3, 1924 |
| 2,421,293 | Shawhan | May 27, 1947 |
| 2,510,737 | Buffington | June 6, 1950 |
| 2,524,568 | Kritzer | Oct. 3, 1950 |